United States Patent [19]
Short

[11] Patent Number: 4,760,766
[45] Date of Patent: Aug. 2, 1988

[54] MANUAL PRODUCE CUTTER

[75] Inventor: R. Stanford Short, Bryan, Ohio

[73] Assignee: Nemco, Incorporated, Hicksville, Ohio

[21] Appl. No.: 876,162

[22] Filed: Jun. 19, 1986

[51] Int. Cl.[4] .......................... B26D 5/20; B26D 1/12; B23D 35/00

[52] U.S. Cl. ...................................... 83/356.3; 83/394; 83/395; 83/478; 83/664; 83/666; 83/676; 83/700

[58] Field of Search ....................... 83/356.3, 354, 355, 83/357, 395, 663, 664, 665, 666, 676, 678, 699, 700, 394, 478; 241/92

[56] References Cited

U.S. PATENT DOCUMENTS

| | | | |
|---|---|---|---|
| 419,364 | 1/1890 | Schoell | 83/356.3 |
| 653,026 | 7/1900 | Locke | 83/356.3 |
| 1,395,425 | 11/1921 | Kennedy | 83/394 |
| 2,834,386 | 5/1958 | Heininger | 83/395 |
| 2,970,622 | 2/1961 | Lundell | 83/676 |
| 4,237,759 | 12/1980 | Jones | 83/356.3 |
| 4,283,979 | 8/1981 | Rakocy | 83/666 |

*Primary Examiner*—Paul A. Bell
*Assistant Examiner*—Scott A. Smith
*Attorney, Agent, or Firm*—Fleit, Jacobson, Cohn & Price

[57] ABSTRACT

A manually actuatable produce cutter is provided including a horizontal produce receiving trough and a disc cutter assembly journalled for rotation about a horizontal axis paralleling the trough and with one sector area of the disc cutter registered with and extending across one end of the trough. The trough includes a follower plate guidingly supported therefrom for movement longitudinally of the trough toward and away from the disc cutter and the latter includes a central support shaft extending outwardly therefrom journalled from the trough and projecting toward the second end thereof. The disc cutter and shaft are axially disengageable from the trough in a direction extending outward of the first end thereof and the latch structure is provided for latching the disc cutter and shaft against axial disengagement from the trough, the latch structure, when in the release position, including portions thereof preventing movement of the following plate beyond a predetermined position toward the disc cutter. Also, the disc cutter includes abutment disc and blade portions adjustably shiftable relative to each other along the shaft from the outer end thereof.

10 Claims, 3 Drawing Sheets

MANUAL PRODUCE CUTTER

BACKGROUND OF THE INVENTION

1. Field of the Invention

This invention relates to a produce cutter-slicer including a manual crank and disc cutter head assembly removably journalled from a mount provided therefor and the crank and disc cutter head assembly includes structure for adjusting the thickness of the cut to be performed thereby. The produce cutter-slicer is constructed in a manner which simplifies the manufacture, usage and cleaning of the cutter-slicer.

2. Description of Related Art

Various different forms of rotary produce cutters and slicers including some of the general structural and operational features of the instant invention heretofore have been provided. Examples of these previously known forms of cutting and slicing devices are disclosed in U.S. Pat. Nos. 419,364, 653,026, 2,834,386, 4,237,759 and 4,283,979. However, these previously known forms of cutting and slicing apparatuses do not include the structural and operational features of the instant invention which enable produce to be cut or sliced in an efficient manner through the utilization of an apparatus which is relatively inexpensive to produce, easy to use in a safe manner and relatively easy to clean and to perform maintenance thereon.

SUMMARY OF THE INVENTION

The cutter-slicer of the instant invention includes a mount which defines a produce trough into which produce may be introduced and along which produce may be advanced for cutting. A combined hand crank and disc cutter head assembly is removably journalled from and extends across the end of the trough toward which produce contained therein may be advanced and the combined crank and disc cutter head assembly may be readily removed for cleaning. In addition, the combined crank and disc cutter head assembly includes integral structure by which the thickness of the cut on produce to be performed may be adjusted.

The main object of this invention is to provide a produce cutter-slicer which may be used in numerous different environments for cutting and slicing produce.

Another object of this invention is to provide a cutter-slicer including structure by which the thickness of the cut or slice to be performed thereby may be readily adjusted.

Still another important object of this invention is to provide a produce cutter-slicer incorporating a readily removable hand crank and disc cutter head assembly whereby cleaning operations may be readily carried out.

Yet another object of this invention is to provide a hand operable cutter-slicer in accordance with the preceding objects and constructed in a manner whereby even inexperienced persons may perform cutting and slicing operations on produce in a manner rendering a high degree of safety on the part of the operator.

Another object of this invention is to provide a produce cutter-slicer constructed in a manner whereby the operator of the slicer may use one hand to manually turn the cutter-slicer head assembly and the other hand of the operator may be used in a remote location to effect feed of the produce to be cut or sliced toward the cutter-slicer head assembly.

A final object of this invention to be specifically enumerated herein is to provide a manual produce cutter in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
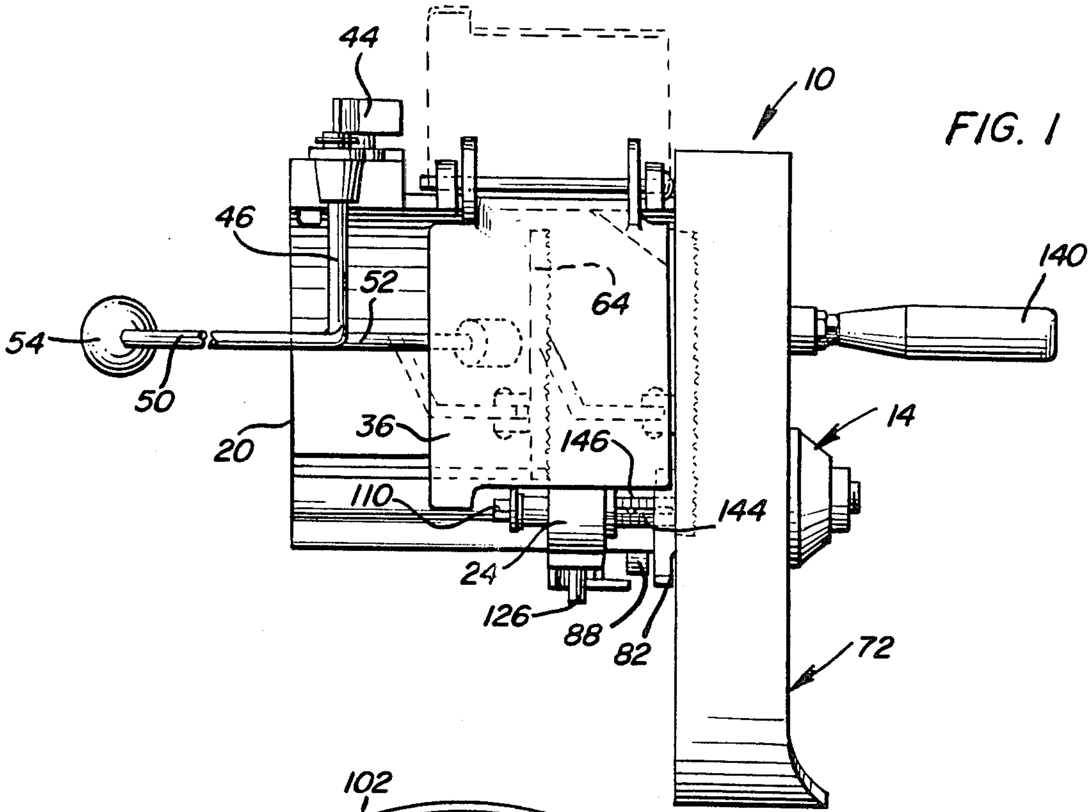
FIG. 1 is a top plan view of the produce cutter of the instant invention.

Referring now more specifically to the drawings, the numeral 10 generally designates the produce cutter of the instant invention. The produce cutter 10 includes a mount referred to in general by the reference numeral 12 and a hand crank and disc cutter head assembly referred to in general by the reference numeral 14. The mount 12 includes a support standard 16 incorporating the horizontally enlarged foot 18 on its lower end for supporting the cutter 10 from a suitable support surface. The upper end of the support standard 16 supports an elongated horizontal trough 20 and the left side of the trough 20 defines a pair of axially spaced integral journal blocks 22 and 24 in which replaceable bearing sleeves 26 and 28 are received. The assembly 14 includes a mounting shaft portion 30 removably journalled through the sleeves 26 and 28 in a manner to be hereinafter more fully set forth.

Figure 4:
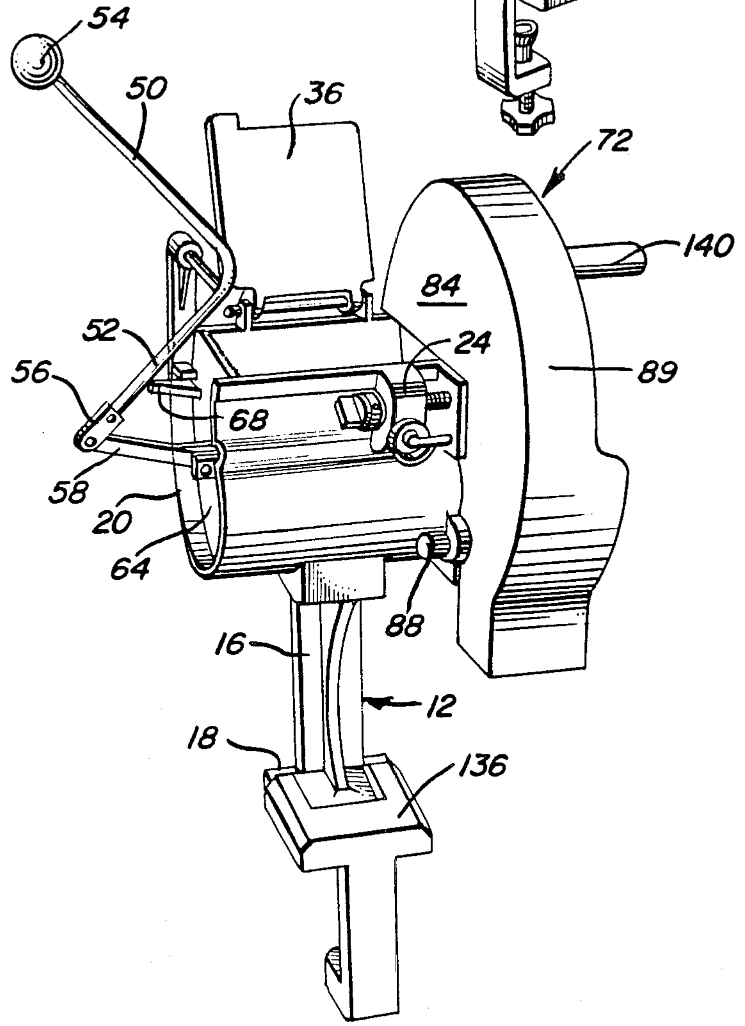
FIG. 4 is a rear perspective view of the produce cutter with the hinged cover for the produce receiving trough of the cutter in an open position.

The trough 20 is open at its top and at its front and rear ends 32 and 34 and a cover 36 is hingedly supported from the forward end of the trough 20 as at 38 and 40 for swinging movement between the open position thereof illustrated in FIG. 4 and a horizontal position closing the upper part of the trough 20 at the forward end 32 thereof as shown in solid lines in FIG. 1.

A mounting bracket 42 is removably supported from the upper rear right-hand portion of the trough 20 by a fastener nut 44 and removably pivotally supports a mounting shaft 46 therefrom extending transversely of the rear end of the trough 20 above the latter. The mounting shaft 46 comprises an integral portion of a bellcrank 48 including right angularly disposed torque input and torque output arms 50 and 52. The free end of the arm 50 includes a knob 54 mounted therefrom and the free end of the arm 52 includes an bifurcated fitting 56 removably supported therefrom and between whose furcations one end of a connecting link 58 is pivotally mounted as at 60. The other end of the connecting link 58 is pivotally mounted as at 62 to a transverse produce feed plate 64 extending transversely of and slidably mounted in the trough 20 for reciprocation longitudinally thereof. The side of the feed plate 64 facing the front end 52 of the trough 20 is roughened as at 66 and the feed plate 64 includes opposite side guide lugs 68 guidingly and slidingly received in guide grooves 70 formed in opposite side upper portions of the trough 20.

Figure 2:
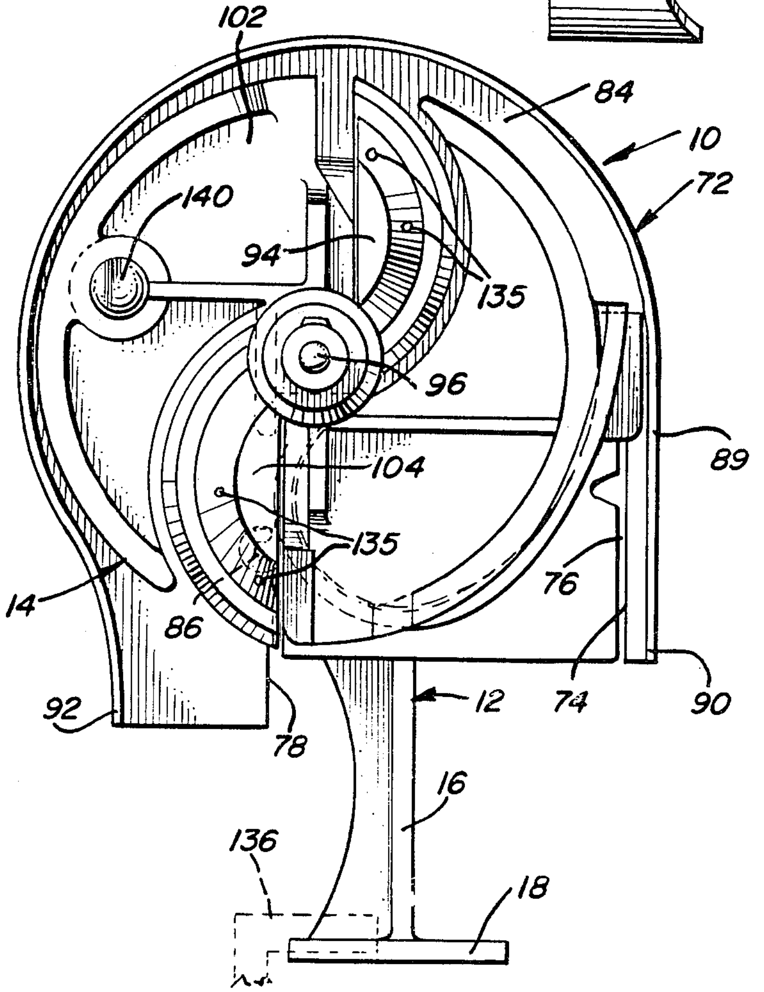
FIG. 2 is a front elevational view of the produce cutter.
Figure 3:
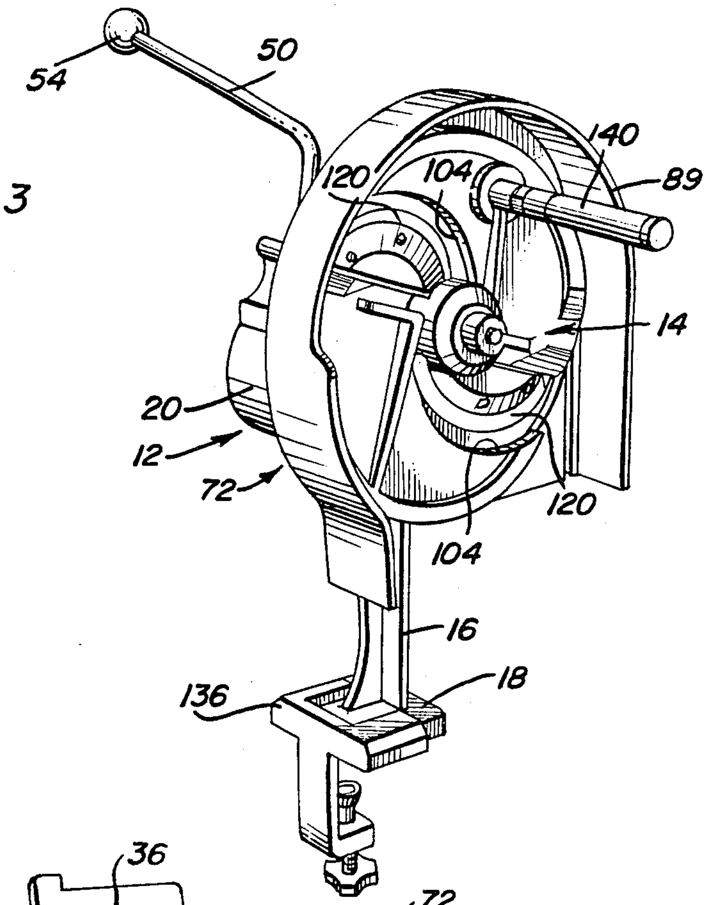
FIG. 3 is a front perspective view of the produce cutter.
Figure 5:
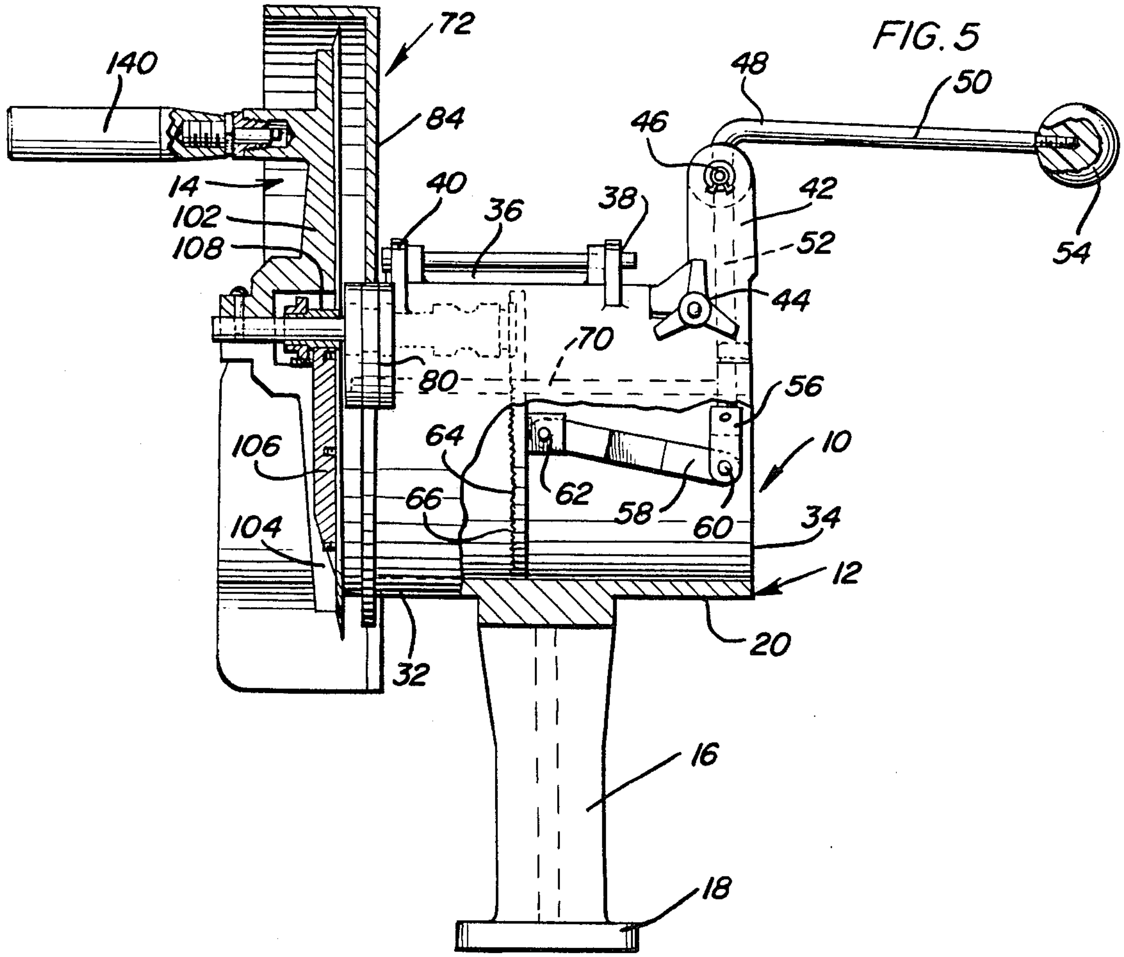
FIG. 5 is a side elevational view of the produce cutter with portions of the mount and cutter head assembly of the cutter broken away and illustrated in vertical section.

A downwardly and forwardly opening shield referred to in general by the reference numeral 72 is provided and defines a downwardly opening notch 74 formed therein including opposite side upstanding margins 76 and 78, see FIG. 2. The margins 76 and 78 are slidingly received in opposite side outwardly opening grooves 80 and 82, see FIGS. 5 and 1, defined by opposite side upper portions of the trough 20 and the shield 72 includes a rear wall 84 in which the notch 74 is formed and including a horizontal notch 86 formed therein in which the shank portion of a threaded lock screw 88 is removably received to prevent upward displacement of the shield 72 from the trough 20. In addition, the shield 72 includes a peripheral flange 89 extending thereabout and including opposite side lower ends 90 and 92 between which the spacing is less than the diameter of the assembly 14. Accordingly, even though the screw 88 is removed, the shield 72 may not be upwardly removed from the trough 20 until such time as the assembly 14 is displaced forwardly from the trough 20.

Figure 6:
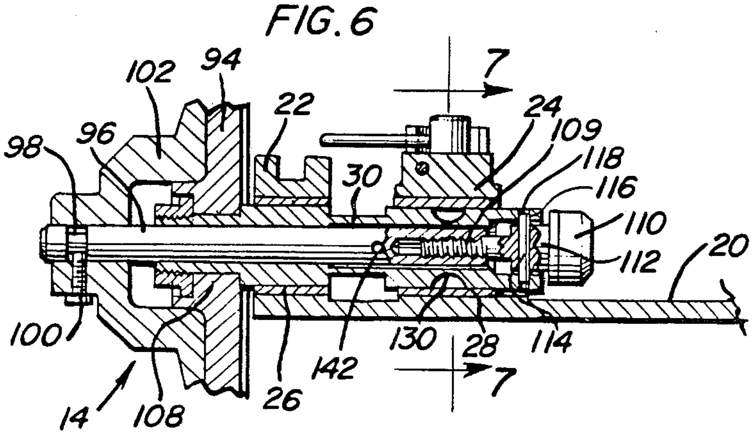
FIG. 6 is an enlarged longitudinal horizontal sectional view of the slice thickness adjusting mechanism of the cutter.

With attention now invited more specifically to FIG. 6 of the drawings, it may be seen that the mounting shaft portion 30 is tubular and has a blade carrier 94 removably mounted on the front end thereof. In addition, an adjustment shaft 96 has its rear end telescoped into the mounting shaft portion 30 and is equipped with a circumferential groove 98 on its forward end in which a setscrew 100 carried by an abutment plate mounted on the shaft 96 is seated. The abutment plate 102 includes diametrically opposite openings 104 formed therein in which blade support arms 106 are received, the blade support arms 106 being carried by a central block portion 108 removably mounted on the forward end of the mounting shaft portion 30. The rear end of the adjustment shaft 96 has the threaded shank 109 of adjusting screw 110 threadedly secured therein and the adjusting screw 110 includes a diametrically reduced hub portion 112 telescoped into the rear end of the mounting shaft portion 30 and equipped with a diametric pin 114 whose opposite ends project outwardly of opposite sides of the hub portion 112 and are received in an inner circumferential groove 116 formed in the rear end of the mounting shaft portion 30. In addition, the mounting shaft portion 30 includes diametrically opposite radial bores 118 formed therein through which the pin 114 may be removed.

In view of the fact that the opposite ends of the pin 114 are held captive in the groove 116, the adjustment screw 110 may be rotated relative to the mounting shaft portion 30, but is held against axial shifting relative thereto. Accordingly, upon rotation of the adjusting screw 110 relative to the mounting shaft portion 30, the adjusting shaft 96 is shifted axially of the mounting shaft portion 30 and the abutment plate 102 is shifted axially of the mounting shaft portion 30 relative to the blade carrier 94 to vary the thickness of the cutting action of the assembly 14 on produce disposed within the trough 20 and forced toward the assembly 14 by the plate 64.

The blade carrier 94 mounts a pair of arctuate blades 120 therefrom received in the openings 104 and the axial spacing between the plane in which the blades 120 are disposed and the rear side of the abutment plate 102 defines the thickness of cut of produce performed by the blades 120.

Figure 7:
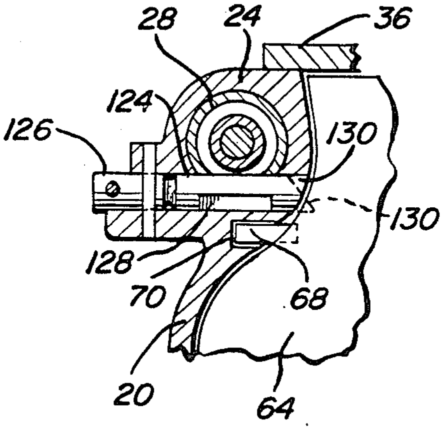
FIG. 7 is a fragmentary vertical sectional view taken substantially upon the plane indicated by the sectional line 7—7 of FIG. 6.

The journal block 24 includes a transverse bore 124 which opens inwardly into the left-hand side of the trough 20 and in which a latching shaft 126 is oscillatably received. The shaft 126 includes a notch 128 therein which may be swung into registry with the interior of the sleeve or bearing 28 and the mounting shaft portion 30 includes a circumferential groove 130 formed therein in which the unnotched side of the latching shaft 126 is receivable to releasably latch the mounting sleeve portion in the journal blocks 22 and 24 against axial displacement relative thereto. When the latching shaft 126 is rotated to a position with the notch 128 registered with the groove 130, the entire assembly 14 may be forwardly displaced relative to the mount 12 and trough 20 in order to axially withdraw the mounting shaft portion 30 from the journal blocks 22 and 24. Thus, the entire assembly 14 may be removed from the mount 12 for servicing and/or cleaning. In addition, it will be noted that the inner end of the latching shaft 126 includes a bevelled terminal end 130 which conforms to the transverse outline of the trough 20 when the latching shaft 126 is in the latching position, but which projects into the interior of the trough 20 as shown in phantom lines in FIG. 7 when the latching shaft 126 is in the release position. The projection of the terminal end 130 into the trough 20 prevents movement of the plate 64, in either direction, therepast. Accordingly, if the mounting shaft portion of the assembly 14 has not been properly latched in the position thereof illustrated in FIG. 6, the plate 64 may not be shifted between its extreme front and rear positions and the produce cutter may not be used. This will prevent accidental usage of the produce cutter 10 when the mounting shaft portion 30 has not been properly latched in the position thereof illustrated in FIG. 6.

The blades 120 are removably supported from the blade support arms 106 by removable threaded fasteners 135 and a clamp structure 136 is provided for removable engagement with the foot 18 and may be used to clamp the cutter 10 in position relative to one marginal edge of a horizontal worktable or the like.

It will be noted that the free end of the arm 50 swings downwardly during forward movement of the plate 64 toward the blade carrier 94. Accordingly, one hand of the operator is engaged with a crank handle 140 carried by the assembly 14 while the other hand of the operator is engaged with the knob 54 at the free end of the arm 50. Thus, the pressure exerted on the plate 64 by the operation to advance produce within the trough forward of the plate 64 toward the assembly 14 may be readily controlled as desired and according to the type of produce being sliced or cut.

It also will be noted that the adjusting shaft 96 includes a diametric pin 142, see FIG. 6, and that the mounting shaft portion 30 includes a pair of diametrically opposite radial slots 144, see FIG. 1, formed therein in which the opposite ends of the pin 142 are slidingly received. Thus, the adjustment shaft 96 is held against rotation relative to the mounting sleeve portion 30. Also, the mounting sleeve portion 30 includes longitudinally spaced indicia 146 with which the opposite ends of the pin 142 are registrable. The indicia 146 indicate the thickness of cut to be performed by the cutter 10 according to the axial displacement of the adjusting shaft 96 relative to the mounting shaft portion 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A produce cutter including a mount, bearing means on said mount, a shaft assembly having first and second ends, said shaft assembly and bearing means including coacting means journalling said shaft assembly from said bearing means against axial shifting relative thereto, disc cutter means carried by the first end of said shaft assembly for rotation therewith, said disc cutter means including abutment disc and cutter blade portions, one of said portions being mounted on said shaft assembly against axial shifting relative thereto and the other of said portions being mounted on said shaft assembly for adjustable shifting axially along said shaft assembly, the second end of said shaft assembly including an axial threaded adjustment screw journalled therefrom against axial shifting relative thereto and including a threaded connection with said other portion.

2. The produce cutter of claim 1 including handle means carried by said disc cutter means on the side thereof remote from said second end of said shaft assembly for applying manual rotary torque to said shaft assembly through said disc cutter means, said coacting means including means enabling axial withdrawal and insertion of said second end of said shaft assembly relative to said bearing means, and latch means operative to releasably latch said shaft assembly relative to said bearing means against axial shifting relative thereto.

3. A produce cutter including a mount, bearing means on said mount, a shaft assembly having first and second ends, said shaft assembly and bearing means including coacting means journalling said shaft assembly from said bearing means against axial shifting relative thereto, disc cutter means carried by the first end of said shaft assembly for rotation therewith, said disc cutter means including abutment disc and cutter blade portions, one of said portions being mounted on said shaft assembly against axial shifting relative thereto and the other of said portions being mounted on said shaft assembly for adjustable shifting axially along said shaft assembly, one end of said shaft assembly including an axial threaded adjustment screw journalled therefrom against axial shifting relative thereto and including a threaded connection with said other portion, said coacting means including means enabling axial withdrawal and insertion of said second end of said shaft assembly relative to said bearing means, and latch means operative to releasably latch said shaft assembly relative to said bearing means against axial shifting relative thereto, said latch means being shiftable relative to said bearing means between active and inactive positions, said mount including elongated trough means generally paralleling said shaft assembly and defining a first end registered with predetermined sector of the area occupied by said disc means, follower means mounted from trough means for guided reciprocation longitudinally therealong, said latch means, when in said inactive position, including abutment means restricting movement of said follower means toward said disc means.

4. The produce cutter of claim 3 wherein said one end of said shaft assembly comprises the second end thereof.

5. A produce cutter including a mount, bearing means on said mount, a horizontal shaft assembly having first and second ends, said shaft assembly and bearing means including coacting means journalling said shaft from said bearing means against axial shifting relative thereto, disc cutter means carried by a first end of said shaft assembly, said disc cutter means including abutment disc and cutter blade portions relatively shiftable axially of the axis of rotation of said shaft assembly, said mount including elongated trough means generally paralleling said shaft assembly and defining a first end thereof registered with a predetermined sector of the area occupied by said disc means, follower means mounted from said trough means for guided reciprocation longitudinally thereof, a bellcrank mounted from said mount for oscillation about an axis extending transversely of said trough means and including a pair of relatively angulated arms disposed generally in a plane normal to the last mentioned axis, elongated pusher link means pivotally connected to and extending between the side of said follower means remote from disc cutter means and one of said arms, the other of said arms including a free end portion swingable downwardly and upwardly in a generally upright arcuate path to effect reciprocation of said follower means in said trough toward and away from said disc cutter means respectively, said coacting means including means enabling axial withdrawal and insertion of said second end of said shaft assembly from said bearing means and latch means operative to releasably latch said shaft assembly relative to said bearing means against axial withdrawal therefrom, said latch means being shiftable relative to said bearing means between active and inactive positions, said latch means, when in said inactive position, including abutment means restricting movement of said follower means toward said disc cutter means.

6. The produce cutter of claim 5 wherein one of said portions is mounted on said shaft assembly against axial shifting relative thereto and the other of said portions is mounted on said shaft assembly for adjustable shifting axially along said shaft assembly, one end of said shaft assembly including an axial threaded adjustment screw journalled therefrom against axial shifting relative thereto including a threaded connection with said one portion.

7. The produce cutter of claim 6 wherein said one end of said shaft comprises the second end thereof.

8. The produce cutter of claim 7 including a shield removably guidingly supported from said first end of said trough opening downwardly and along the axis of rotation of said shaft assembly toward said disc cutter means and loosely embracingly receiving the latter in recessed position therein, said shield being guidingly supported from said first end of said trough means for upward disengagement relative thereto, said shield projecting downwardly below said disc cutter means and defining a reduced width dimension extending transversely of the axis of rotation of said shaft assembly less than the diameter of said disc cutter means, whereby said shaft assembly and disc cutter means must be axially withdrawn relative to said bearing means before said shield may be upwardly displaced relative to said trough means for disengagement therefrom.

9. A produce cutter including a mount, a horizontal producer receiving trough supported from said mount and including first and second ends, a vertically disposed disc cutter assembly journalled for rotation about a horizontal axis disposed to one side of said trough and with said disc cutter assembly including a sector thereof registered with and closing said first end of said trough, a downwardly and horizontally opening shield guidingly supported from said first end of said trough for upward disengagement therefrom and with said shield opening horizontally outwardly of said first end of said trough and having said disc cutter assembly loosely received therein in recessed position within the confines of said shield, said shield defining a reduced dimension downwardly opening throat of a dimension measured horizontally and transversely of the axis of rotation of said disc cutter assembly less than the diameter of said disc cutter assembly, said trough and disc cutter assembly including coacting means removably journalling said disc cutter assembly for axial removal of said disc cutter assembly through the horizontally opening side of said shield relative to said trough, said trough and disc cutter assembly including coacting latch means releasably preventing axial shifting of said disc cutter means relative to said trough.

10. A produce cutter including a mount, bearing means on said mount, a horizontal shaft assembly having first and second ends, said shaft assembly and bearing means including coacting means journalling said shaft from said bearing means against axial shifting relative thereto, disc cutter means carried by a first end of said shaft assembly, said disc cutter means including abutment disc and cutter blade portions relatively shiftable axially of the axis of rotation of said shaft assembly, said mount including elongated trough means generally paralleling said shaft assembly and defining a first end thereof registered with a predetermined sector of the area occupied by said disc means, follower means mounted from said trough means for guided reciprocation longitudinally thereof, and said coacting means including means enabling axial withdrawal and insertion of said second end of said shaft assembly from said bearing means and latch means operative to releasably latch said assembly relative to said bearing means against axial withdrawl therefrom, said latch means being shiftable relative to said bearing means between active and inactive positions, said latch means means, when in said inactive position, including abutment means restricting movement of said follower means toward said disc cutter means.

* * * * *